B. S. Hyer.
Cultivator.
N° 89,409.   Patented Apr. 27, 1869.
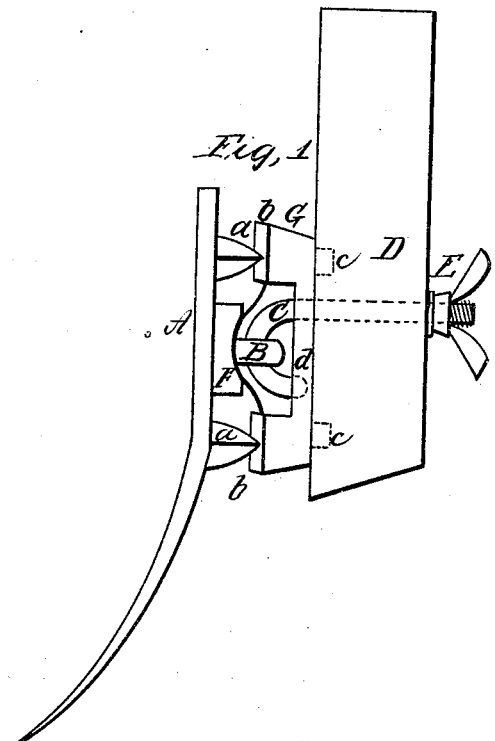
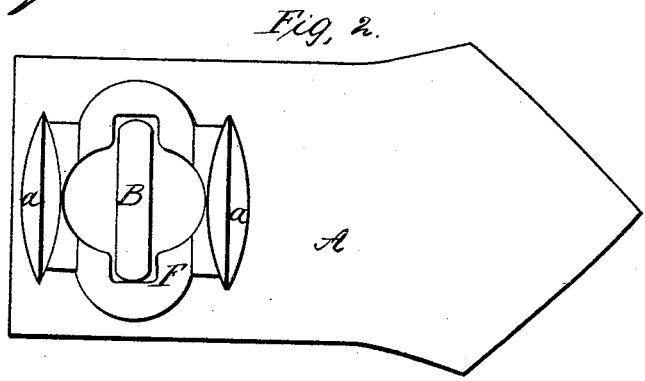
Witnesses,
Thos. J. Roney
W. A. Timmy
Inventor
Benjamin S. Hyers

BENJAMIN S. HYERS, OF PEKIN, ILLINOIS.

Letters Patent No. 89,409, dated April 27, 1869.

IMPROVEMENT IN CULTIVATORS.

The Schedule referred to in these Letters Patent and making part of the same.

*To all whom it may concern:*

Be it known that I, BENJAMIN S. HYERS, of the town of Pekin, in the county of Tazewell, and State of Illinois, have invented new and useful Improvements in Cultivator-Plows; and I do hereby declare that the following is a full and exact description thereof, reference being had to the accompanying drawings, forming part of this specification, and to the letters of reference marked thereon.

My invention relates to that class of agricultural implements used for the purpose of weeding out corn, potatoes, and other crops planted in rows. Its object is to provide a cultivator-blade or tooth in such a manner that it may be readily adjusted so as to throw the soil either to or from the rows as may be desired, thus obviating the necessity of providing two sets of blades or teeth for this purpose. In cultivating a crop when it is young and tender, it is essential that the soil should be moved from the rows toward the space between, so that the soil and weeds shall not be thrown upon the crop which would be thereby injured or killed.

This invention consists in a peculiar and novel combination of a loop riveted or otherwise rigidly secured to the blade or tooth of a cultivator; a hook fitting into the said loop, and two plates, one of which is provided with a slot that allows this plate to fit closely but loosely over the loop.

At each end of this said plate are also provided two suitable ribs or projections made in the form of an arc of a circle which closely fit and freely work in corresponding grooves in another plate secured to the shaft or leg of the cultivator; the whole being constructed in such a manner that the blade may be readily and conveniently set to any desired angle to the line of draught, and firmly secured in its position by means of a set-screw.

To enable others skilled in the art to make and use my invention, I will proceed to describe its construction and the mode of its operation.

Figure 1 represents a side elevation of my improved cultivator-blade attached to the shaft or leg.

Figure 2 is a plan view of the back of the blade, showing the relative positions of the loop and the ribs or projections on the plate.

Letters of like name and kind indicate like parts in each of the figures.

A is the blade of the cultivator, made of any suitable shape and dimensions, to which is riveted or otherwise rigidly secured the loop B, through which passes the hook C.

The shank of this hook passes through the shaft or leg D of the cultivator, and is provided with a set-screw E, by means of which the shaft D and the blade A, with its appendages are firmly held in position.

F is a plate which fits on the back of the blade A, and is provided with a slot to allow it to fit closely but loosely over the loop B, and also with the ribs or projections $a\ a$, which are made in the form of an arc of a circle, and which fit closely, and freely work in the corresponding grooves $b\ b$, with which the plate G is provided.

This plate G is fitted to the shaft D, and is held in its place by means of the lugs which pass into the said shaft, as indicated by the dotted lines $c\ c$.

A depression or indentation is made on the face of this plate so as to receive the end of the hook C, as seen at $d$, for the purpose of preventing vibration when the cultivator is at work.

It will be seen that the ribs $a\ a$ fitting and working in the corresponding grooves $b\ b$ allow the blade A to be set at any desired angle to the line of draught, and that the said blade, with its appendages, is retained in position by means of the hook C, which passes through the loop B, and is made tight by means of the set-screw E, in such a manner that the blade A may be securely fixed at the desired angle. Also, that the slot in the plate F, fitting closely to the loop B, and the end of the hook C, entering into the plate G, which is fitted to the shaft or leg D, by means of the lugs $c\ c$, prevent any vibration or displacement of the several parts when the cultivator is at work, the whole being firmly and securely fixed in position by the set-screw E; and likewise that each shaft with its blade works independently of the other shaft or shafts, and is not affected or disarranged by the adjusting of the rest.

The advantages of my invention are evident for the reason that it forms a novel, simple, cheap, and efficient implement for the purposes for which it is designed. The blade can be set at any desired angle to the line of draught, so that the soil may be thrown to either side, thus obviating the necessity of providing two or more sets of blades or teeth; also, at whatever angle the blade may be set and worked, the strain or pressure will always be on the centre of the shaft or leg; it will likewise be seen that a straight piece of wood may be used for the shaft or leg, thus avoiding the expense of shaping it to any desired form, as no fitting or filling is required on the shaft or leg, with the exception of making the holes to receive the lugs and the shank of the hook.

Having thus described my invention,

What I claim as new, and desire to secure by Letters Patent of the United States, is—

1. The loop B, when rigidly secured to the blade A, in combination with the hook C, substantially as and for the purposes herein shown and described.

2. The plates F and G, in combination with the loop B and hook C, as herein shown and described, and for the purposes set forth.

3. Also, the loop B, hook C, and plates F and G, in combination with the blade A and leg D, when constructed and arranged substantially as herein shown and described.

BENJAMIN S. HYERS.

Witnesses:
 THOS. J. RONEY,
 STEPHEN RONEY.